（12） United States Patent
Kang et al.

(10) Patent No.: US 9,799,885 B2
(45) Date of Patent: Oct. 24, 2017

(54) BINDER FOR SECONDARY BATTERY EXHIBITING EXCELLENT ADHESION FORCE

(75) Inventors: MinAh Kang, Daejeon (KR); Young-Min Kim, Daejeon (KR); Chang Bum Ko, Daejeon (KR); Ok Sun Kim, Daejeon (KR)

(73) Assignee: LG Chem, Ltd. (KR)

( * ) Notice: Subject to any disclaimer, the term of this patent is extended or adjusted under 35 U.S.C. 154(b) by 378 days.

(21) Appl. No.: 13/808,446

(22) PCT Filed: Jul. 5, 2011

(86) PCT No.: PCT/KR2011/004912
§ 371 (c)(1),
(2), (4) Date: Apr. 19, 2013

(87) PCT Pub. No.: WO2012/005496
PCT Pub. Date: Jan. 12, 2012

(65) Prior Publication Data
US 2013/0209876 A1    Aug. 15, 2013

(30) Foreign Application Priority Data
Jul. 9, 2010  (KR) .................. 10-2010-0066091

(51) Int. Cl.
| | |
|---|---|
| *H01M 6/22* | (2006.01) |
| *H01M 4/62* | (2006.01) |
| *H01M 4/131* | (2010.01) |
| *C08F 220/14* | (2006.01) |
| *C08F 220/18* | (2006.01) |
| *H01M 10/0525* | (2010.01) |
| *C08F 212/08* | (2006.01) |
| *C08F 220/26* | (2006.01) |
| *C08F 222/10* | (2006.01) |
| *C08F 220/44* | (2006.01) |

(52) U.S. Cl.
CPC ........... *H01M 4/622* (2013.01); *C08F 220/14* (2013.01); *C08F 220/18* (2013.01); *H01M 4/131* (2013.01); *C08F 212/08* (2013.01); *C08F 220/26* (2013.01); *C08F 220/44* (2013.01); *C08F 222/1006* (2013.01); *H01M 10/0525* (2013.01)

(58) Field of Classification Search
CPC ...... H01M 4/622; C08F 220/18; C08F 220/44
See application file for complete search history.

(56) References Cited

U.S. PATENT DOCUMENTS

| | | | |
|---|---|---|---|
| 6,436,573 B1 | 8/2002 | Goto et al. | |
| 2005/0069769 A1 | 3/2005 | Nakayama et al. | |
| 2006/0251966 A1 | 11/2006 | Yamakawa et al. | |
| 2006/0257739 A1* | 11/2006 | Ryu | H01M 4/13 429/217 |
| 2006/0275661 A1* | 12/2006 | Kim | C08F 220/18 429/217 |
| 2009/0325069 A1* | 12/2009 | Anada | C09J 123/147 429/217 |

FOREIGN PATENT DOCUMENTS

| | | |
|---|---|---|
| CN | 101156264 A | 4/2008 |
| CN | 101180755 A | 5/2008 |
| JP | 3283853 A | 12/1991 |
| JP | 8250123 A | 9/1996 |
| KR | 20040078927 A | 9/2004 |
| KR | 20060107341 A | 10/2006 |

OTHER PUBLICATIONS

International Search Report dated Feb. 25, 2012 for PCT/KR2011/004912.
Search Report from European Application No. 11803782.9, dated Jul. 27, 2016.

* cited by examiner

*Primary Examiner* — Ladan Mohaddes
(74) *Attorney, Agent, or Firm* — Lerner, David, Littenberg, Krumholz & Mentlik, LLP

(57) ABSTRACT

Provided is a binder for secondary battery electrodes comprising polymer particles obtained by polymerizing three or more kinds of monomers wherein the polymer particles have a mean particle diameter of 0.3 µm to 0.7 µm. The binder exhibits superior adhesion force to electrode current collectors and excellent support force to the active material and basically improves safety of electrodes, thus providing a secondary battery with superior cycle characteristics.

12 Claims, No Drawings

BINDER FOR SECONDARY BATTERY EXHIBITING EXCELLENT ADHESION FORCE

CROSS REFERENCE TO RELATED APPLICATIONS

The present application is a national phase entry under 35 U.S.C. §371 of International Application No. PCT/KR2011/004912, filed Jul. 5, 2011, published in Korean, which claims priority from Korean Patent Application No. 10-2010-0066091, filed Jul. 9, 2010. The disclosures of said applications are incorporated by reference herein.

TECHNICAL FIELD

The present invention relates to a binder for secondary battery electrodes. More specifically, the present invention relates to a binder for secondary battery electrodes comprising polymer particles obtained by polymerizing three or more kinds of monomers wherein the polymer particles have a mean particle diameter of 0.3 µm to 0.7 µm.

BACKGROUND ART

Rapidly increasing use of fossil fuels has led to an increase in demand for use of alternative or clean energy. In light of such trends, generation and storage of electricity using electrochemical reaction are a very active area of research.

In recent years, representative examples of electrochemical devices using electrochemical energy are secondary batteries, and application range thereof continues to expand.

Recently, technological development and increased demand associated with portable equipment such as portable computers, cellular phones and cameras have brought about an increase in the demand for secondary batteries as energy sources. Among these secondary batteries, lithium secondary batteries having high energy density and operating electric potential, long lifespan and low self-discharge have been actively researched and are commercially available and widely used.

In addition, increased interest in environmental issues has led to a great deal of research into electric vehicles, hybrid electric vehicles or the like as alternatives to vehicles using fossil fuels such as gasoline vehicles and diesel vehicles. These electric vehicles and hybrid electric vehicles generally use nickel-metal hydride secondary batteries as power sources. However, a great deal of study associated with lithium secondary batteries with high energy density and discharge voltage is currently underway and some are commercially available.

Conventional typical lithium secondary batteries use graphite as an anode active material. Lithium ions of a cathode are repeatedly intercalated into and de-intercalated from the anode to realize charge and discharge. The theoretical capacity of batteries may vary depending upon the type of the electrode active material, but generally cause deterioration in charge and discharge capacity in the course of the cycle life of the battery.

The primary reason behind such phenomenon is that separation between an electrode active material or separation between the electrode active material and a current collector due to volume variation of the electrode, as batteries are charged and discharged, results in insufficient realization of function of the active material. In addition, in the process of intercalation and de-intercalation, lithium ions intercalated into the anode cannot be sufficiently de-intercalated and active sites of the anode are thus decreased. For this reason, charge/discharge capacity and lifespan of batteries may decrease as the batteries are cycled.

In particular, in order to improve discharge capacity, in the case where natural graphite having a theoretical discharge capacity of 372 mAh/g is used in combination with a material such as silicon, tin or silicon-tin alloys having high discharge capacity, volume expansion of the material considerably increases, in the course of charging and discharging, thus causing isolation of the anode material from the electrode material. As a result, battery capacity disadvantageously rapidly decreases over repeated cycling.

Accordingly, there is an increasing demand in the art for binder and electrode materials which can prevent separation between the electrode active material, or between the electrode active material and the current collector upon fabrication of electrodes via strong adhesion and can control volume expansion of electrode active materials upon repeated charging/discharging via strong physical properties, thus improving structural stability of electrodes and thus performance of batteries.

Polyvinylidene difluoride (PVdF), a conventional solvent-based binder, does not satisfy these requirements. Recently, a method for preparing a binder, in which styrene-butadiene rubber (SBR) is polymerized in an aqueous system to produce emulsion particles and the emulsion particles are mixed with a neutralizing agent, or the like, is used and is commercially available. Such a binder is advantageous in that it is environmentally friendly and reduces use of the binder and thereby increasing battery capacity. However, this binder exhibits improved adhesion maintenance due to the elasticity of rubber, but has no great effect on adhesion force.

Accordingly, there is an increasing need for development of binders which improves cycle properties of batteries, contributes to structural stability of electrodes and exhibits superior adhesion force.

DISCLOSURE

Technical Problem

Therefore, the present invention has been made to solve the above and other technical problems that have yet to be resolved.

As a result of a variety of extensive and intensive studies and experiments to solve the problems as described above, the inventors of the present invention developed a binder for secondary battery electrodes comprising polymer particles obtained by polymerizing three or more kinds of monomers wherein the polymer particles have a mean particle diameter of 0.3 µm to 0.7 µm, as described below, and confirmed that the use of this binder contributes to improvement in cycle properties of batteries due to superior adhesion force to electrode current collectors and excellent support force to the active material even drying at high temperatures. The present invention was completed based on this discovery.

Technical Solution

The binder for secondary battery electrodes according to the present invention comprises polymer particles obtained by polymerizing three or more kinds of monomers wherein the polymer particles have a mean particle diameter of 0.3 µm to 0.7 µm.

In a preferred embodiment, the three or more kinds of monomers are a mixture of a (meth)acrylic acid ester monomer (a); at least one monomer selected from the group consisting of an acrylate monomer, a vinyl monomer and a nitrile monomer (b); and an unsaturated monocarbonic acid monomer (c).

In this configuration, based on the total weight of the binder, the (meth)acrylic acid ester monomer (a) may be present in an amount of 15 to 99% by weight, the monomer (b) may be present in an amount of 1 to 60% by weight, and the unsaturated monocarbonic acid monomer (c) may be present in an amount of 1 to 25% by weight. More preferably, the monomer (a) is present in an amount of 25 to 90% by weight, the monomer (b) is present in an amount of 3 to 55% by weight, and the monomer (c) is present in an amount of 1 to 20% by weight. These content ranges may be suitably changed depending on the characteristics of the monomers and physical properties of the binder.

For example, the (meth)acrylic acid ester monomer, as the monomer (a), may be at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-ethyl hexyl acrylate, 2-ethyl hexyl acrylate, 2-hydroxy ethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxylethyl methacrylate and hydroxylpropyl methacrylate.

For example, the acrylate monomer, as the monomer (b), may be selected from the group consisting of methacryloxy ethylethylene urea, β-carboxy ethylacrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, cetyl acrylate, stearyl acrylate, lauryl methacrylate, cetyl methacrylate and stearyl methacrylate.

The vinyl monomer, as the monomer (b), may be at least one selected from the group consisting of styrene, α-methylstyrene, β-methylstyrene, p-t-butylstyrene, divinyl benzene and mixtures thereof.

The nitrile monomer, as the monomer (b), may be at least one selected from the group consisting of succinonitrile, sebaconitrile, fluoronitrile, chloronitrile, acrylonitrile, methacrylonitrile and the like. More preferably, the nitrile monomer is at least one selected from the group consisting of acrylonitrile, methacrylonitrile and mixtures thereof.

The unsaturated monocarbonic acid monomer, as the monomer (c), may be at least one selected from maleic acid, fumaric acid, methacrylic acid, acrylic acid, glutaconic acid, itaconic acid, tetrahydrophthalic acid, crotonic acid, nadic acid or a mixture thereof.

If desired, the binder may further comprise a (meth) acrylamide-based monomer. In this case, the (meth)acrylamide-based monomer may be present in an amount of 0.1 to 10% by weight, based on the total weight of the binder.

The binder of the present invention may further comprise a molecular weight controller and/or a cross-linking agent, as polymerization additives, in addition to the monomers.

The molecular weight controller may be selected from those well-known in the art. Examples of the cross-linking agent include ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, trimethylol methane triacrylate, aryl methacrylate (AMA), triaryl isocyanurate (TAIC), triaryl amine (TAA), diaryl amine (DAA), polyethylene glycol dimethacrylate, polypropylene glycol dimethacrylate, polybutylene glycol diacrylate and the like.

The binder according to the present invention may be prepared by emulsion polymerization. The polymerization temperature and polymerization time may be suitably determined depending on the polymerization method or polymerization initiator employed, and for example, the polymerization temperature may be from about 50° C. to 100° C. and the polymerization time may be from about 1 to about 20 hours.

Examples of the emulsifying agent used for emulsion polymerization include oleic acid, stearic acid, lauric acid, fatty acid salts such as sodium or potassium salts of mixed fatty acids, general anionic emulsifying agents such as rosin acid, and non-ionic emulsifying agents such as polyoxyethylene lauryl ether, polyoxyethylene glycol, and polyoxyethylenenonylphenyl ether.

In order to fabricate electrodes of secondary batteries, a slurry is coated and then dried. In a case of an aqueous binder, it is difficult to dry the slurry since water is evaporated. Also, it is important to completely dry the slurry, since moisture is a factor that inhibits stability of batteries. As drying temperature increases, process time shortens and drying speed increases, but a great amount of the binder also moves to the coated surface. Accordingly, adhesive force is considerably decreased and it is thus difficult to increase a drying temperature.

On the other hand, the binder according to the present invention comprises polymer particles having a diameter larger than a mean particle diameter of general polymer particles. Accordingly, a relatively great amount of polymer particles are present on a current collector after drying due to large particle diameter and an adhesive force to the current collector can be thus improved. However, an excessively large particle diameter may have a negative effect on performance of batteries such as conductivity. As defined above, the particle diameter may be 0.3 μm to 0.7 μm, preferably 0.4 μm to 0.6 μm, more preferably 0.4 μm to 0.5 μm. When taking into consideration the fact that a polymer mean particle diameter is 0.1 μm to 0.3 μm in general emulsion polymerization, the size of polymer particles in the binder according to the present invention is large.

The mean particle diameter of the polymer can be for example controlled by various methods including changing the type or amount of emulsifying agent or using polymerization through two steps, which can be sufficiently implemented by those skilled in the emulsion polymerization.

In the present invention, the binder may further comprise one or more selected from the group consisting of a viscosity controller and a filler. The viscosity controller and the filler will be described in detail in the following.

The present invention provides a mix for secondary battery electrodes comprising the aforementioned binder and an electrode active material capable of intercalating and de-intercalating lithium.

The binder may be present in an amount of 0.5 to 20% by weight, preferably 1 to 10% by weight, based on the weight of the electrode mix.

The mix for secondary battery electrodes preferably further comprises a conductive material. The conductive material will be described in detail in the following.

The electrode active material is preferably a lithium transition metal oxide powder or a carbon powder.

Accordingly, the present invention provides an electrode for secondary batteries in which the mix for secondary battery electrodes is applied to a current collector.

The electrode may be fabricated by applying the mix for secondary battery electrodes to a current collector, followed by drying and rolling. The electrode for secondary batteries may be a cathode or an anode.

For example, the cathode is fabricated by applying a mixture consisting of a cathode active material, a conductive material and a binder to a cathode current collector, followed by drying. The anode is fabricated by applying a mixture consisting of an anode active material, a conductive material and a binder to an anode current collector, followed by drying. In some cases, the anode may comprise no conductive material.

The electrode active material is a material causing electrochemical reaction in the electrode and is divided into a cathode active material and an anode active material depending on the type of electrode.

The cathode active material is lithium transition metal oxide which includes two or more transition metals, and examples thereof include, but are not limited to, layered compounds such as lithium cobalt oxide ($LiCoO_2$) or lithium nickel oxide ($LiNiO_2$) substituted with one or more transition metals; lithium manganese oxide substituted with one or more transition metals; lithium nickel oxide represented by the formula of $LiNi_{1-y}M_yO_2$ (in which M=Co, Mn, Al, Cu, Fe, Mg, B, Cr, Zn or Ga and includes one or more elements among the elements, $0.01 \leq y \leq 0.7$); lithium nickel cobalt manganese composite oxides represented by $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine lithium metal phosphate represented by the formula $Li_{1+x}M_{1-y}M'_yPO_{4-z}X_z$ (in which M=transition metal, preferably Fe, Mn, Co or Ni, M'=Al, Mg or Ti, X=F, S or N, $-0.5 \leq x \leq 0.5$, $0 \leq y \leq 0.5$, and $0 \leq z \leq 0.1$).

Examples of the anode active material include carbon and graphite materials such as natural graphite, artificial graphite, expanded graphite, carbon fiber, incompletely-graphited carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material are more preferred. The material may be used alone or in combination of two or more thereof.

The conductive material serves to further improve conductivity of the electrode active material and is commonly added in an amount of 0.01 to 30% by weight, based on the total weight of the electrode mix. Any conductive material may be used without particular limitation so long as it has suitable conductivity without causing adverse chemical changes in the fabricated secondary battery. Examples of the conductive material that can be used in the present invention include conductive materials, including graphite such as natural or artificial graphite; carbon blacks such as carbon black, acetylene black, Ketjen black, channel black, furnace black, lamp black and thermal black; carbon derivatives such as carbon nanotubes or fullerene; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The current collector in the electrode is a material causing electrochemical reaction and is divided into a cathode current collector and an anode current collector depending on the type of electrode.

The cathode current collector is generally fabricated to have a thickness of 3 to 500 μm. There is no particular limit to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium, silver or the like.

The anode current collector is generally fabricated to have a thickness of 3 to 500 μm. There is no particular limit to the anode current collector, so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium, silver, or the like, and aluminum-cadmium alloys.

These current collectors include fine irregularities on the surface thereof so as to enhance adhesion to electrode active materials. In addition, the current collectors may be used in various forms including films, sheets, foils, nets, porous structures, foams and non-woven fabrics.

The mixture (electrode mix) of an electrode active material, a conductive material and a binder may further comprise at least one selected from the group consisting of a viscosity controller and a filler.

The viscosity controller controls the viscosity of the electrode mix so as to facilitate mixing of the electrode mix and application thereof to the current collector and may be added in an amount of 30% by weight or less, based on the total weight of the electrode mix. Examples of the viscosity controller include, but are not limited to, carboxymethylcellulose, polyacrylic acid and the like.

The filler is a component used to inhibit expansion of the electrode. There is no particular limit to the filler, so long as it does not cause adverse chemical changes in the fabricated battery and is a fibrous material. Examples of the filler include olefin polymers such as polyethylene and polypropylene; and fibrous materials such as glass fibers and carbon fibers.

The present invention also provides a lithium secondary battery comprising the electrode.

The lithium secondary battery generally further comprises a separator and a lithium salt-containing non-aqueous electrolyte, in addition to the electrodes.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt.

Examples of the non-aqueous electrolytic solution that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material that is readily soluble in the above-mentioned non-aqueous electrolyte and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate and imides.

An organic solid electrolyte or an inorganic solid electrolyte may be used, if necessary.

Examples of the organic solid electrolyte utilized in the present invention, mention include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte utilized in the present invention, mention include nitrides, halides and sulfates of lithium such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH and Li$_3$PO$_4$—Li$_2$S—SiS$_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further comprise halogen-containing solvents such as carbon tetrachloride and ethylene trifluoride. Further, in order to improve high-temperature storage characteristics, the non-aqueous electrolyte may further comprise carbon dioxide gas, fluoro-ethylene carbonate (FEC), propene sultone (PRS) or fluoro-ethlene carbonate (FEC).

The secondary batteries according to the present invention may be used for battery cells used as power sources of small-sized devices and may be used as unit batteries of middle- or large-sized modules comprising a plurality of battery cells used as power sources of middle- or large-sized devices.

Preferably, examples of the middle- or large-sized devices include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooters); electric golf carts, energy storage systems and the like.

Advantageous Effects

As apparent from the foregoing, the binder for secondary battery electrodes according to the present invention comprises polymer particles obtained by polymerizing three or more kinds of monomers wherein the polymer particles have a mean particle diameter of 0.3 μm to 0.7 μm, thus contributing to improvement in cycle properties of batteries due to superior adhesion force to electrode current collectors and excellent support force to the active material even during drying at high temperatures.

BEST MODE

Now, the present invention will be described in more detail with reference to the following Examples. These examples are provided only to illustrate the present invention and should not be construed as limiting the scope and spirit of the present invention.

Example 1

Butyl acrylate (70 g), styrene (20 g) and acrylic acid (10 g) as monomers and polyoxyethylene glycol and sodium lauryl sulfate as emulsifying agents were added to water containing potassium persulfate as a polymerization initiator, and these ingredients were mixed and polymerized at 70° C. for about 10 hours. A binder for secondary battery electrodes containing polymer particles that are obtained by polymerizing the monomers and have a mean particle diameter of 0.3 μm was prepared through polymerization. The mean particle diameter of the polymer can be controlled by controlling amounts of two emulsifying agents. As an amount of the two emulsifying agents increases, particle diameter decreases and as an amount of the two emulsifying agents decreases, particle diameter increases.

Example 2

A binder for secondary battery electrodes comprising polymer particles having a mean particle diameter of 0.4 μm was prepared in the same manner as Example 1, except that an amount of the emulsifying agent was decreased.

Example 3

A binder for secondary battery electrodes comprising polymer particles having a mean particle diameter of 0.5 μm was prepared in the same manner as Example 1, except that an amount of the emulsifying agent was decreased.

Example 4

A binder for secondary battery electrodes polymer particles having a mean particle diameter of 0.6 μm was prepared in the same manner as Example 1, except an amount of the emulsifying agent was decreased.

Example 5

A binder for secondary battery electrodes comprising polymer particles having a mean particle diameter of 0.3 μm was prepared in the same manner as Example 1, except that acrylamide (1 g) was further used as a monomer.

Example 6

A binder for secondary battery electrodes comprising polymer particles having a mean particle diameter of 0.3 μm was prepared in the same manner as Example 1, except that acrylonitrile was used as the monomer instead of styrene.

Comparative Example 1

A binder for secondary battery electrodes comprising polymer particles having a mean particle diameter of 0.1 μm was prepared in the same manner as Example 1, except that an amount of the emulsifying agent was increased.

Comparative Example 2

A binder for secondary battery electrodes comprising polymer particles having a mean particle diameter of 0.2 μm was prepared in the same manner as Example 1, except that an amount of the emulsifying agent was increased.

Comparative Example 3

A binder for secondary battery electrodes comprising polymer particles having a mean particle diameter of 0.2 μm was prepared in the same manner as Example 6, except that an amount of the emulsifying agent was increased.

Comparative Example 4

A binder for secondary battery electrodes comprising polymer particles having a mean particle diameter of 0.8 μm was prepared in the same manner as Example 1, except that an amount of the emulsifying agent was considerably decreased.

Experimental Example 1

Adhesion Force Test

First, for the binders of Examples 1 to 6 and the binders of Comparative Examples 1 to 4, an anode active material, a conductive material, a thickener, and a binder were mixed in a ratio of 95:1:1:3 to prepare a slurry and the slurry was coated on an Al foil to fabricate an electrode. The electrode was dried at 90° C. and 120° C.

The electrode thus fabricated was pressed to a predetermined thickness, cut into a predetermined size and fixed on a glass slide and 180 degree peel strength was measured, while the current collector was peeled off. The results thus obtained are shown in Table 1. Evaluation was based on an average of five or more peel strengths.

TABLE 1

| | Adhesion force (gf/cm) | |
|---|---|---|
| | Drying at 90° C. | Drying at 120° C. |
| Ex. 1 | 28 | 25 |
| Ex. 2 | 32 | 27 |
| Ex. 3 | 34 | 29 |
| Ex. 4 | 30 | 25 |
| Ex. 5 | 30 | 27 |
| Ex. 6 | 31 | 26 |
| Comp. Ex. 1 | 19 | 15 |
| Comp. Ex. 2 | 23 | 17 |
| Comp. Ex. 3 | 20 | 17 |
| Comp. Ex. 4 | 21 | 20 |

As can be seen from Table 1 above, electrodes employing the binders of Examples 1 to 6 according to the present invention exhibited considerably high adhesion force, as compared to electrodes employing the binders of Comparative Examples 1 to 4. In particular, it can be seen from comparison between the Comparative Example 2 and Example 1, and between Comparative Example 3 and Example 6, that when the mean particle diameter is 0.3 μm or more, an adhesion force is considerably increased. Also, variation in adhesion force according to particle diameter is great at 120° C., as compared to at 90° C. The reason for this is that when the mean particle diameter is higher than 0.3 μm, movement of the binder is considerably decreased during drying than when the mean particle diameter is lower than 0.3 μm, and the effect increases, as temperature increases. The reason is thought that a decrease in adhesion force caused by movement of the binder is greater than an increase in adhesion force caused by specific surface area of the binder.

On the other hand, in Comparative Example 4 in which although the mean particle diameter is large, an adhesion force is low, when the mean particle diameter of the binder is 0.8 μm, movement of the binder is decreased, but a specific surface area of the binder is extremely decreased, an area where the binder contacts an active material is decreased and the adhesion force is thus greatly decreased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A binder for secondary battery electrodes comprising polymer particles, wherein the polymer of the polymer particles is a copolymer obtained by polymerizing three or more kinds of monomers,
wherein the polymer particles have a mean particle diameter of 0.5 μm to 0.7 μm, and
wherein the three or more kinds of monomers consist of a mixture of a (meth)acrylic acid ester monomer (a); at least one monomer selected from the group consisting of an acrylate monomer, a vinyl monomer and a nitrile monomer (b); and a unsaturated monocarbonic acid monomer (c),
wherein the vinyl monomer is at least one selected from the group consisting of styrene, α-methylstyrene, β-methylstyrene, p-t-butylstyrene, and divinyl benzene.

2. The binder according to claim 1, wherein the (meth) acrylic acid ester monomer (a) is present in an amount of 15 to 99% by weight, the monomer (b) is present in an amount of 1 to 60% by weight, and the unsaturated monocarbonic acid monomer (c) is present in an amount of 1 to 25% by weight, based on the total weight of the binder.

3. The binder according to claim 1, wherein the (meth) acrylic acid ester monomer is at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-ethyl hexyl acrylate, 2-ethyl hexyl acrylate, 2-hydroxy ethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxyethyl methacrylate and hydroxypropyl methacrylate.

4. The binder according to claim 1, wherein the acrylate monomer is selected from the group consisting of methacryloxy ethylethylene urea, β-carboxy ethylacrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, cetyl acrylate, stearyl acrylate, lauryl methacrylate, cetyl methacrylate and stearyl methacrylate.

5. The binder according to claim 1, wherein the nitrile monomer is at least one selected from the group consisting of succinonitrile, sebaconitrile, fluoronitrile, chloronitrile, acrylonitrile and methacrylonitrile.

6. The binder according to claim 1, wherein the unsaturated monocarbonic acid monomer is at least one selected from maleic acid, fumaric acid, methacrylic acid, acrylic acid, glutaconic acid, itaconic acid, tetrahydrophthalic acid, crotonic acid, isocrotonic acid and nadic acid.

7. A mix for secondary battery electrodes comprising:
the binder for secondary battery electrodes according to claim 1; and
an electrode active material capable of intercalating and de-intercalating lithium.

8. The mix according to claim 7, further comprising one or more selected from the group consisting of a viscosity controller and a filler.

9. The mix according to claim 7, wherein the electrode active material is a lithium transition metal oxide powder or a carbon powder.

10. An electrode for secondary batteries, in which the mix for electrodes according to claim 7 is applied to a current collector.

11. The electrode according to claim 10, wherein the current collector has a thickness of 3 to 500 μm and includes fine irregularities on the surface thereof.

12. A lithium secondary battery comprising the electrode for secondary batteries according to claim 11.

* * * * *